Dec. 20, 1966  H. G. FOSTER  3,292,226
SNAP HOOKS
Filed Sept. 29, 1964
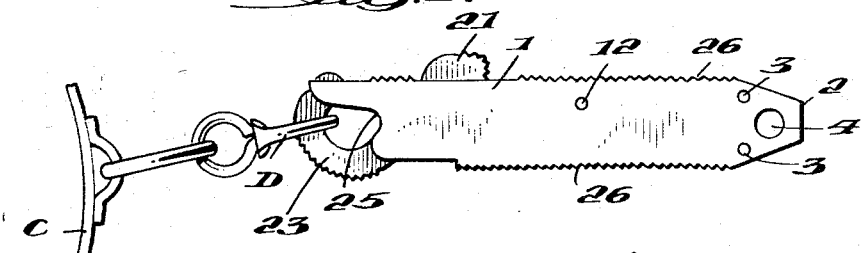
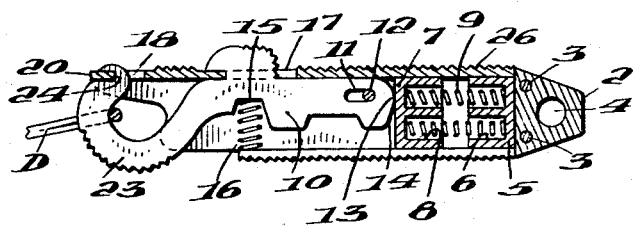
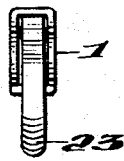
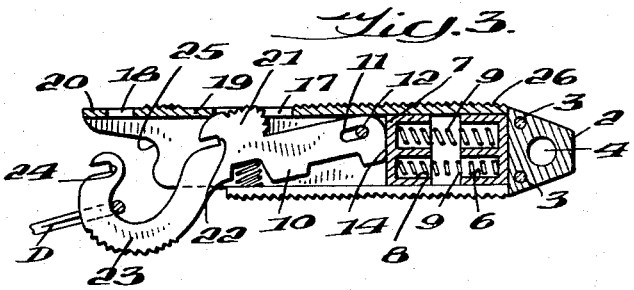
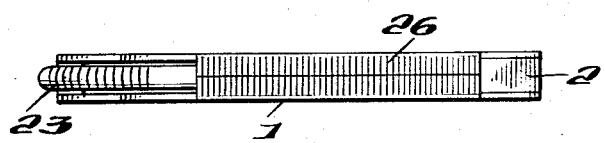
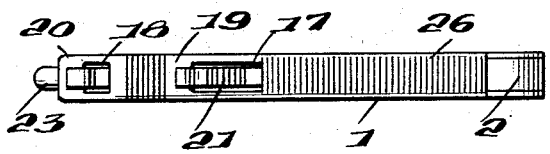
INVENTOR
HARRY G. FOSTER,
BY
ATTORNEYS United States Patent Office 3,292,226
Patented Dec. 20, 1966

3,292,226
SNAP HOOKS
Harry G. Foster, 610 Moran Ave.,
Mullens, W. Va. 25882
Filed Sept. 29, 1964, Ser. No. 399,987
8 Claims. (Cl. 24—239)

This invention relates to improvements in snap hooks and more particularly to such snap hooks as are used for attachment to dog collars and similar articles.

In the handling of dogs, especially dogs of the show and hunting types, it is highly desirable that secure attachment be made of a leash to the collar of the dog, but with provisions for immediate detachment therefrom when desired, or upon an appropriate signal. A snap hook is usually employed for this purpose. Various types have been proposed heretofore, but these have been objectionable for one reason or another, especially because of bulkiness, insecurity, lack of immediate detachment and various other objections.

One object of this invention is to simplify and improve the construction of a snap hook for the purpose described.

Another object of the invention is to provide a snap hook constructed so as to maintain a secure connection with the collar of the animal or other article to be attached thereto and yet one which is relatively simple of construction and sturdy to effect a secure hold on the animal.

Still another object of the invention is to provide for opening and closing movements of the snap or hook member under control of the thumb and forefinger of the user, not only to maintain the hook effectively closed, but also to maintain the hook in open position until it is desired that it be closed.

These objects are accomplished, according to one embodiment of the invention, by the provision of an elongated tubular housing which is open at one end and has a hook member mounted in the housing for swinging movement with respect thereto. A pin and slot connection are preferably provided between the hook member and the housing for freedom of swinging and sliding movement of the hook member. The housing is provided with elongated slots in one edge thereof, while the hook member has a thumb engaging knob on one edge in position to enter one slot and a hook portion on the end of the hook member in position to enter the other slot. Aligned notches in the knob and hook portion engaged over edge portions of the slots for secure interlocking engagement, to hold the hook member in closed position.

Swinging movement of the hook member is effected by a spring interposed between one edge of the hook member and the housing. Longitudinal movement of the hook member is effected by a follower member slidably mounted in the housing and urged outwardly by a pair of coiled springs. The abutting end of the hook member is substantially wedge-shaped, with a bevelled edge toward the follower to hold the hook member in open position until positively closed.

A spring is interposed between the side of the hook member opposite the knob and the housing, normally tending to press the hook member to a closed position. When closed, the end of the hook member and the knob project into slots in the edge of the housing and are locked in such closed position until positively released.

This embodiment is illustrated in the accompanying drawings, in which:

FIG. 1 is a side elevation of the snap hook;
FIG. 2 is a longitudinal section therethrough, showing the hook member closed;
FIG. 3 is a similar view, showing the hook member open;
FIG. 4 is an end elevation of the closed snap hook;
FIG. 5 is a similar view of the open snap hook;
FIG. 6 is an edge view of the closed snap hook from one side; and
FIG. 7 is a similar view from the opposite side.

The snap hook is adapted to be used particularly for a dog collar or similar article for restraining an animal. The collar is designated generally at C and usually has a D-ring D attached thereto for connection with the snap hook.

The snap hook comprises an elongated relatively flat housing 1, according to this embodiment, and which is tubular in shape, with at least one end open. Any suitable means may be used for fabricating the housing, such as the formation thereof of sheet metal, although a drawn tube may be employed for the purpose. At the closed end of the housing 1 is a spacer 2 which is interposed between ear portions formed on opposite sides of the housing and secured by fastenings 3. An orifice 4 extends through these ear portions and through the spacer 2 for attachment of a leash or other suitable means thereto.

The spacer 2 serves to close the one end of the housing 1 and to hold in place a spring retaining member, generally indicated at 5, which, in this embodiment, has a pair of cup-shaped recesses 6 in the end thereof opening toward the open end of the housing 1. A follower 7 is slidably mounted in the housing 1 spaced from the retainer 5 and is also provided with cup-shaped recesses 8 in the follower. A pair of coiled springs 9 are telescoped into the recesses 6 and 8 for sliding the follower 7 forward in the housing 1 and yieldably holding the follower in such advance position.

A hook member is indicated at 10 and is preferably elongated and telescoped in the housing. At its inner end, the hook member 10 is provided with an elongated slot 11 receiving a cross pin 12 therethrough, which pin and slot form a pivotal and sliding connection between the inner end of the hook member 10 and the housing 1.

The extreme end of the hook member 10 is substantially wedge-shaped, as indicated at 13, having a bevelled end face 14 opposed to the end face of the follower 7 so that when the hook member is in open position, as shown in FIG. 3, this edge face 14 will abut flatly against the end face of the follower 7 and thereby tend to hold the hook member 10 in its open position.

Formed in one edge of the hook member 10 is a spring saddle 15, the opposite sides of which flare with respect to each other. The saddle 15 forms a seat for a coiled spring 16 which is interposed between the saddle 15 and the adjacent edge of the housing 1, normally tending to urge the hook member 10 to a closed position when it is moved free of the housing and thereby capable of closing.

The housing 1 is provided with a pair of slots 17 and 18 in the opposite edge thereof and spaced apart lengthwise of the housing. Each of the slots 17 and 18 has an adjacent edge portion of the housing forming a locking bar, indicated at 19 and 20, respectively.

The hook member 10 is provided with a thumb engaging knob 21 of a size to enter the slot 17 free thereof. The knob 21 has a notch 22 in the forward edge thereof in position to receive the locking bar 19 in said notch 22 when the hook member is in closed position, as shown in FIG. 2.

At the extreme forward end of the hook member 10, a hook 23 is formed of a suitable size and shape so as to engage the D-ring D or other article to be engaged thereby. The extreme end portion of the hook 23 is adapted to enter the slot 18. This end portion of the hook 23 is provided with a notch 24 in position to engage over the locking bar 20 when the end of the hook 23 is in the slot 18. In such position, the notches 22 and 24 are aligned with each other and simultaneously engage the locking bars 19 and 20, thereby holding the hook member effectively in closed position, as shown in FIGS. 1 and 2.

The opposite sides of the housing 1 are notched out at 25 so as to form a suitable opening for receiving the D-ring D when the hook is closed. One side of the notch 25 is extended more than the other, so that if the dog should get its collar engaged with an obstruction, such as a tree, stump, rock, etc., there will be no undue stress imparted to the casing and prevent the hook from being forced back far enough to disengage the portions 19 and 20.

The edges of the housing 1 may be roughened as by serrations 26, if desired, and likewise such roughened portions may be formed on the knob 21 and on the peripheral portion of the hook 23.

In the use of the snap hook, the hook member is normally closed, as indicated in FIGS. 1 and 2, in which position it engages the D-ring effectively and securely. The springs 9 and follower 7 normally tend to urge the hook member 10 forwardly relative to the housing 1, with the notches 22 and 24 engaging over the locking bars 19 and 20. This forms an effective and secure closure of the snap hook and holds it closed until released.

When it is desired to release the snap hook, this may be accomplished by applying the thumb to the knob 21 and urging the hook member 10 backward relative to the housing 1. This will apply a longitudinal sliding movement to the hook member against the tension of the springs 9, but sufficient to disengage the notches 22 and 24 from the locking bars 19 and 20. The slot 11 will allow such displacement of the hook member relative to the housing. As the hook member 10 is moved rearward, the spring pressure applied by the follower 7 to the wedge-shaped end 13 of the member 10 will tend to kick the hook 23 open as soon as the notches 23 and 24 are disengaged from the locking bars 19 and 20 (thus tilting the hook member 10 to the angular position shown in FIG. 3.

It will be noted that the wedge-shaped end of the hook member is laterally offset relative to the axis of the pin 12, so as to impart an eccentric action to the length of the member 10, thus effecting the movement mentioned upon release of the hook member.

The closing movement of the hook member is effected by gripping around the hook 23 with the forefinger and moving it rearward in the housing and up into closed position. This may be accomplished very simply and readily and will cause an immediate engagement of the notches 22 and 24 by the locking bars 19 and 20, which locking engagement is then maintained by the action of the springs 9, which immediately thereafter push the hook member forward again relative to the housing.

This forms a very simple and inexpensive construction and yet one that is secure to hold the animal and to permit ready and instantaneous release, when desired. The mechanism is enclosed from dust, and it will last a long time with minimum care. It is well balanced and easily handled.

While the invention has been illustrated and described in one embodiment, it is recognized that variations and changes may be made therein without departing from the invention, as set forth in the claims.

I claim:

1. A snap hook comprising an elongated tubular housing having an open end, said housing having a pair of slots in a side thereof and spaced apart lengthwise of the housing, a hook member telescoped in the housing and having a hook on one end thereof, projecting from the open end, means mounting an end portion of the hook member completely within the housing for longitudinal and swinging movements relative to the housing, a thumb-engaging hook on one side of the hook member projecting through one of the slots and with a notch in a side thereof in position to receive an edge of the housing at one end of said slot, the hook being in position to enter the other slot and having a notch in an edge thereof in position to receive an edge of the housing at one end of said slot, and means spaced lengthwise of the housing on the opposite side of the mounting means from both slots and yieldably urging said end portion of the hook member in a longitudinal direction to engage the edge portions of the slots with the notches to close the snap hook.

2. A snap hook comprising an elongated tubular housing having an open end, said housing having a pair of slots in a side thereof and spaced apart lengthwise of the housing, said housing having an edge portion forming a locking bar at a corresponding end of each slot, a hook member telescoped in the housing and having a hook on one end thereof projecting from the open end, means pivotally connecting an end portion of the hook member completely within the housing, a thumb-engaging knob on one side of the hook member projecting through one of the slots, the hook having an end portion in position to enter the other slot, each of said knob and hook end portions having notches in corresponding sides thereof in position for simultaneous lock engagement with the locking bars to hold the hook member in place, and means spaced lengthwise of the housing on the opposite side of the pivot means from both the hook and the knob and yieldably urging the hook member longitudinally in the housing into lock engagement with both locking bars to close the snap hook.

3. A snap hook comprising an elongated tubular housing having an open end, said housing having a pair of slots in a side thereof and spaced apart lengthwise of the housing, said housing having an edge portion forming a locking bar at a corresponding end of each slot, a hook member telescoped in the housing and having a hook on one end thereof projecting from the open end, a pivot member extending through the hook member and having a longitudinally slidable pivotal connection therewith, a thumb-engaging knob on one side of the hook member projecting through one of the slots, the hook having an end portion in position to enter the other slot, each of said knob and hook end portions having notches in corresponding sides thereof in position for simultaneous lock engagement with the locking bars to hold the hook member in place, and means spaced lengthwise of the housing on the opposite side of the pivot member from both the knob and hook end portion and yieldably urging the hook member longitudinally in the housing into lock engagement with both locking bars.

4. A snap hook comprising an elongated tubular housing having an open end, said housing having a pair of slots in a side thereof and spaced apart lengthwise of the housing, said housing having an edge portion forming a locking bar at a corresponding end of each slot, a hook member telescoped in the housing, and having a hook on one end thereof projecting from the open end, means engaging the other end of the hook member for yieldably urging the hook member lengthwise of the housing, and separate means for causing swinging movement of the hook member other end within the housing during said relative lengthwise movement to open the snap hook, a thumb-engaging knob on one side of the hook member projecting through one of the slots, the hook having an end portion in position to enter the other slot, each of said knob and hook end portions having notches in corresponding sides thereof in position for simultaneous lock engagement with the locking bars to hold the hook member in place when the snap hook is closed.

5. A snap hook comprising an elongated tubular housing having an open end, said housing having a pair of slots in a side thereof and spaced apart lengthwise of the housing, said housing having an edge portion forming a locking bar at a corresponding end of each slot, a hook member telescoped in the housing and having a hook on one end thereof projecting from the open end, a thumb-engaging knob on one side of the hook member projecting through one of the slots, the hook having an end portion in position to enter the other slot, each of said knob and hook end portions having notches in corresponding sides thereof in position for simultaneous lock engagement with the locking bars to hold the hook member in place, spring means in the housing acting in one direction on the hook member tending to cause engagement of the notches with the locking bars, and separate spring means in the housing tending to move the hook end portion and knob into the respective slots.

6. A snap hook comprising an elongated tubular housing having an open end, said housing having a pair of slots in a side thereof and spaced apart lengthwise of the housing, said housing having an edge portion forming a locking bar at a corresponding end of each slot, a hook member telescoped in the housing and having a hook on one end thereof projecting from the open end, a thumb-engaging knob on one side of the hook member projecting through one of the slots, the hook having an end portion in position to enter the other slot, each of said knob and hook end portions having notches in corresponding sides thereof in position for simultaneous lock engagement with the locking bars to hold the hook member in place, a follower member slidably mounted in the housing, spring means acting to move the follower member toward the hook member, said hook member having a wedge shaped end portion bearing against the follower member with a bevelled surface in position to lie flat against the follower member when the hook member is released tending to hold said hook member in said released position.

7. A snap hook comprising an elongated tubular housing having an open end, said housing having a pair of slots in a side thereof and spaced apart lengthwise of the housing, said housing having an edge portion forming a locking bar at a corresponding end of each slot, a hook member telescoped in the housing and having a hook on one end thereof projecting from the open end, a thumb-engaging knob on one side of the hook member projecting through one of the slots, the hook having an end portion in position to enter the other slot, each of said knob and hook end portions having notches in corresponding sides thereof in position for simultaneous lock engagement with the locking bars to hold the hook member in place, said hook member having a slot therein with a pivot pin extending through the slot and mounting the hook member for longitudinal and swinging movements relative to the housing, a spring interposed between said hook member and the housing tending to swing the hook member into engagement of the notches and locking bars, a follower member slidably mounted in the end of the housing opposite the open end, a pair of springs acting on the follower member tending to move said follower member toward the hook member, said hook member having a bevelled end surface which is spaced from the follower member when the hook member is in closed position and abutting flatly thereagainst in the open position of the hook member tending to hold said member open.

8. A snap hook comprising an elongated tubular housing having an open end, a hook member telescoped in the housing and having a hook on one end portion thereof projecting from the open end, means mounting the opposite end portion of the hook member for swinging movement about an axis, a yieldable abutment at the last-mentioned end of the hook member urging the hook member to an open or closed position, and means forming a plane bearing face on the last-mentioned end of the hook member and diverging to opposite sides of the mounting axis with an apex bearing against the yieldable abutment to cause opening swinging movement of the hook member upon release of the snap hook.

References Cited by the Examiner
UNITED STATES PATENTS

| | | | |
|---|---|---|---|
| 677,626 | 7/1901 | Booth | 24—239 X |
| 2,652,809 | 9/1953 | Foster | 119—114 |
| 2,701,402 | 2/1955 | Foster | 24—239 |

WILLIAM FELDMAN, *Primary Examiner.*

DONALD A. GRIFFIN, *Examiner.*